US010555320B2

(12) United States Patent
Guo

(10) Patent No.: US 10,555,320 B2
(45) Date of Patent: Feb. 4, 2020

(54) APPARATUS AND METHOD IN WIRELESS COMMUNICATION SYSTEM

(71) Applicant: SONY CORPORATION, Tokyo (JP)

(72) Inventor: Xin Guo, Beijing (CN)

(73) Assignee: SONY CORPORATION, Tokyo (JP)

(*) Notice: Subject to any disclaimer, the term of this patent is extended or adjusted under 35 U.S.C. 154(b) by 314 days.

(21) Appl. No.: 15/316,771

(22) PCT Filed: Jun. 16, 2015

(86) PCT No.: PCT/CN2015/081553
§ 371 (c)(1),
(2) Date: Dec. 6, 2016

(87) PCT Pub. No.: WO2015/192766
PCT Pub. Date: Dec. 23, 2015

(65) Prior Publication Data
US 2017/0202001 A1 Jul. 13, 2017

(30) Foreign Application Priority Data
Jun. 19, 2014 (CN) .......................... 2014 1 0276993

(51) Int. Cl.
H04W 72/08 (2009.01)
H04W 84/10 (2009.01)
(Continued)

(52) U.S. Cl.
CPC .......... H04W 72/085 (2013.01); H04L 5/006 (2013.01); H04W 4/021 (2013.01); H04W 76/14 (2018.02); H04W 84/10 (2013.01); H04W 84/20 (2013.01)

(58) Field of Classification Search
CPC ... H04B 7/15507; H04L 5/006; H04L 5/0069; H04W 4/021; H04W 72/04; H04W 72/085; H04W 84/20; H04W 76/14; H04W 84/10
See application file for complete search history.

(56) References Cited

U.S. PATENT DOCUMENTS

2012/0093098 A1* 4/2012 Charbit ................. H04W 72/04
370/329
2014/0321355 A1* 10/2014 Choi .................. H04B 7/15507
370/315
2015/0094057 A1 4/2015 Lu et al.

FOREIGN PATENT DOCUMENTS

| CN | 102164425 A | 8/2011 |
| CN | 102958066 A | 3/2013 |
| WO | 2013/165291 A1 | 11/2013 |

OTHER PUBLICATIONS

International Search Report dated Sep. 16, 2015 in PCT/CN2015/081553 filed Jun. 16, 2015.

* cited by examiner

Primary Examiner — Khoa Huynh
(74) Attorney, Agent, or Firm — Xsensus LLP

(57) ABSTRACT

An apparatus and method in a wireless communication system. The apparatus includes a dynamic network planning trigger unit and a master user equipment selecting unit. The dynamic network planning trigger unit triggers, based on a predetermined trigger event, a dynamic network planning in an area managed by the apparatus. The dynamic network planning includes selection of a master user equipment used for device-to-device communication, and the master user equipment receives signals from a base station during the device-to-device communication process and relays signals between the base station and a slave user equipment. The master user equipment selecting unit selects, from user (Continued)

equipment in the area according to quality of channels between the user equipment and the base station, one or more user equipment as master user equipment, distances between the master user equipment being greater than the intervals.

19 Claims, 9 Drawing Sheets

(51) Int. Cl.
    *H04W 76/14*    (2018.01)
    *H04L 5/00*     (2006.01)
    *H04W 4/021*   (2018.01)
    *H04W 84/20*   (2009.01)

APPARATUS AND METHOD IN WIRELESS COMMUNICATION SYSTEM

FIELD

The present disclosure relates to the field of wireless communication, and in particular to an apparatus and a method for dynamic network planning in a wireless communication system.

BACKGROUND

With rapid development of computer and communication technology, a global information network is evolved to an Internet Protocol (IP)-based Next Generation Network (NGN). The amount of user equipment, service requirement and application scenario is increasing exponentially, therefore, the shortage of radio spectrum resource is further intensified. In this circumstance, Dynamic Network is proposed to explore reuse efficiency of radio spectrum resource by adaptively adjusting the network architecture, including functions of network nodes and data transmission paths and so on, during the network operation, and thus to satisfy the user requirement while guaranteeing effective resource utilization.

FIG. 1 is a schematic diagram of an example architecture of dynamic network. A wireless network generally consists of two kinds of logical entities, termed network infrastructure and user equipment (UE). As shown in FIG. 1(a), the network is formed by Base Stations (BSs) and UEs and a certain UE is only associated with some BS. During the network operation, the architecture of the network changes to be the one as shown in FIG. 1(b). The user equipment which provide signal relay service between base stations and other user equipment turn to be master user equipment (Master UE, mUE). The user equipment which associate with and obtain signal relay service from some mUE become slave user equipment (Slave UE, sUE). The user equipment which only associate with and obtain services from base station is called direct user equipment (Direct UE, dUE).

However, due to complexity and variability of the architecture, it makes network management difficult to involve dynamic network. An effective network management mechanism is required for dynamic network to decide whether a network architecture needs to be changed and how to change if required. But existing work provides neither performance evaluation of network architecture nor evaluation result based architecture design method for dynamic network.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later. Throughout this specification, the term "equipment" is used to indicate both singular and plural forms; the term "equipments" is also used to indicate the plural form.

In view of the above issue, an object of the present disclosure is to provide an apparatus and a method in a wireless communication system, which are capable of performing a dynamic network performance evaluation and making a dynamic network planning decision based on the evaluation. With the apparatus and method according to the present disclosure, it is possible to make a network planning decision on which the system resource utilization efficiency can be guaranteed.

In an aspect of the present disclosure, an apparatus in a wireless communication system is provided. The apparatus includes: a dynamic network planning triggering unit configured to trigger a dynamic network planning in a region managed by the apparatus based on a predetermined trigger event, in which the dynamic network planning includes selecting a master user equipment for a device to device communication, and the master user equipment receives a signal from a base station and relays a signal between the base station and a slave user equipment during the device to device communication; and a master user equipment selecting unit configured to select one or more user equipments from user equipments in the region as master user equipments based on a channel quality between the base station and the user equipment, in which a distance between the master user equipments is larger than an interval distance.

According to a preferred embodiment of the present disclosure, the apparatus may further include: an interval distance calculating unit configured to acquire performance parameter information, including a transmission power and a Signal to Interference plus Noise Ratio requirement, of each of the user equipments in the region, and calculate the interval distance between the master user equipments based on the acquired information.

According to another preferred embodiment of the present disclosure, slave user equipment associated with the one or more master user equipments distributed based on the interval distance may have a higher signal reception quality than a predetermined threshold for signals relayed by the associated master user equipment.

According to another preferred embodiment of the present disclosure, the master user equipments may reuse communication resources to provide services to associated slave user equipments, and a service collectively provided by the base station and the one or more master user equipments distributed based on the interval distance may achieve an optimized network capacity.

According to another preferred embodiment of the present disclosure, the apparatus may further include a reconfiguration instructing unit configured to send a reconfiguration instruction to network nodes involved in the dynamic network planning, including the master user equipments and the base station, so as to instruct the network nodes to change current network connections.

According to another preferred embodiment of the present disclosure, the apparatus may further include a distribution status estimating unit configured to estimate a distribution status of the user equipments in the region based on position information of the user equipments in the region. Preferably, the interval distance calculating unit may be further configured to calculate the interval distance according to the distribution status, and the master user equipment selecting unit may be further configured to select the master user equipments according to the distribution status.

According to another preferred embodiment of the present disclosure, for a circular region having a predetermined radius within an entirety of the region, if a node distribution density in the circular region is higher than a node distribution density in the entirety of the region, the distribution status estimating unit may estimate that the distribution status of the user equipments is Cluster with respect to the predetermined radius, otherwise, the distribution status estimating unit may estimate that the distribution status of the user equipments is Regular.

According to another preferred embodiment of the present disclosure, the predetermined radius may be smaller than or equal to an effective transmission distance between the user equipments.

According to another preferred embodiment of the present disclosure, the apparatus may further include a slave user equipment selecting unit configured to determine, for each of the master user equipment, a slave user equipment to be served by the master user equipment based on positions of user equipment other than the master user equipment in the region and a data relaying capability of the master user equipment; and a direct user equipment determining unit configured to determine a user equipment other than the selected master user equipment and the selected slave user equipment in the region as a direct user equipment, which directly obtains service from the base station.

According to another preferred embodiment of the present disclosure, the apparatus may further include: a judging unit configured to judge, in response to an occurrence of the predetermined trigger event in the region, whether to activate the dynamic network planning by comparing an expected maximum network capacity achieved by the dynamic network planning based on the interval distance with a current network capacity.

According to another preferred embodiment of the present disclosure, the predetermined trigger event may include at least one of: a predetermined timer for triggering the dynamic network planning having expired, network performance degrading and thus failing to meet requirements of the user equipment, network performance parameters reported by the user equipment indicating a poor channel quality, and a change of a network structure.

In another aspect of the present disclosure, a method in a wireless communication system is further provided. The method includes: a dynamic network planning triggering step of triggering a dynamic network planning in a region in which the method is performed, based on a predetermined trigger event, in which the dynamic network planning includes selecting a master user equipment for a device to device communication, and the master user equipment receives a signal from a base station and relays a signal between the base station and a slave user equipment during the device to device communication; and a master user equipment selecting step of selecting one or more user equipment from user equipment in the region as master user equipment based on a channel quality between the base station and the user equipment, in which a distance between the master user equipment is larger than an interval distance.

In another aspect of the present disclosure, a memory medium is further provided. The memory medium includes machine readable program codes which, when being executed on an information processing apparatus, cause the information processing apparatus to perform a method including: a dynamic network planning triggering step of triggering a dynamic network planning in a region in which the method is performed, based on a predetermined trigger event, in which the dynamic network planning includes selecting a master user equipment for a device to device communication, and the master user equipment receives a signal from a base station and relays a signal between the base station and a slave user equipment during the device to device communication; and a master user equipment selecting step of selecting one or more user equipment from user equipment in the region as master user equipment based on a channel quality between the base station and the user equipment, in which a distance between the master user equipment is larger than an interval distance.

In another aspect of the present disclosure, a program product is further provided. The program product includes machine executable instructions which, when being executed on an information processing apparatus, cause the information processing apparatus to perform a method including: a dynamic network planning triggering step of triggering a dynamic network planning in a region in which the method is performed, based on a predetermined trigger event, in which the dynamic network planning includes selecting a master user equipment for a device to device communication, and the master user equipment receives a signal from a base station and relays a signal between the base station and a slave user equipment during the device to device communication; and a master user equipment selecting step of selecting one or more user equipment from user equipment in the region as master user equipment based on a channel quality between the base station and the user equipment, in which a distance between the master user equipment is larger than an interval distance.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF EMBODIMENTS

Figure 1:
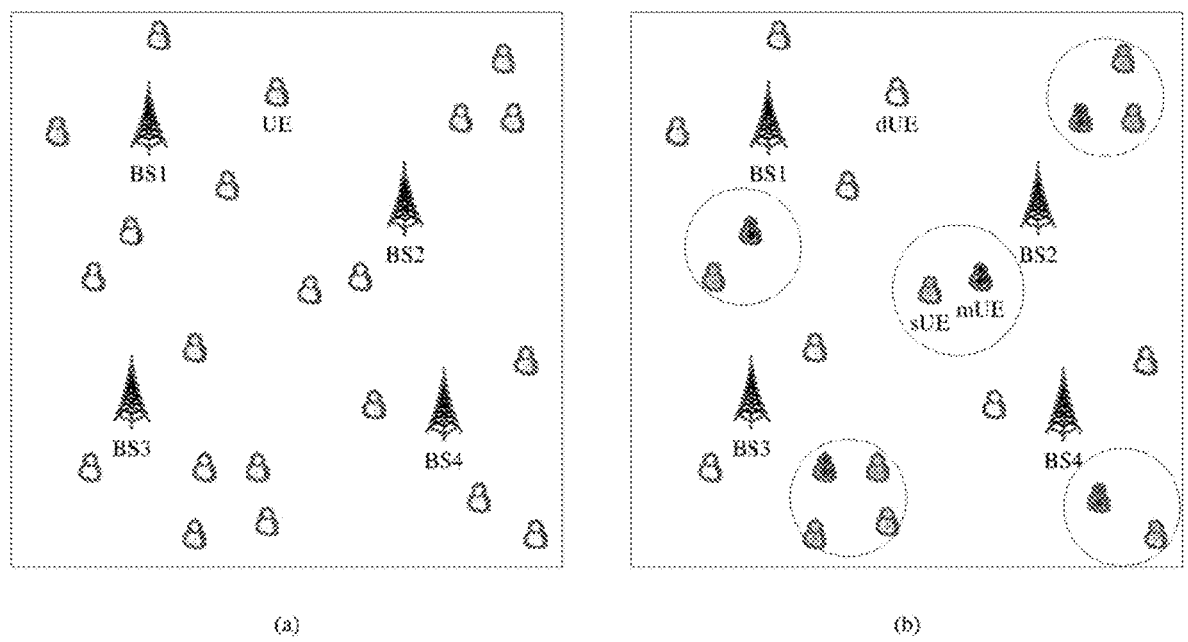
FIG. 1 is a schematic diagram showing an example architecture of a dynamic network.

Exemplary embodiments of the present disclosure will be described below in conjunction with the accompanying drawings. For the sake of clarity and conciseness, not all the characteristics of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

In the following, embodiments of the present disclosure will be described with reference to FIG. 2 to FIG. 11.

Figure 2:
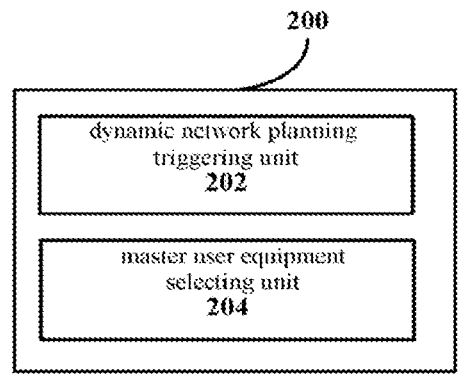
FIG. 2 is a block diagram showing a function configuration example of an apparatus in a wireless communication system according to an embodiment of the present disclosure.

FIG. 2 is a block diagram showing a function configuration example of an apparatus in a wireless communication system according to an embodiment of the present disclosure.

The technology of the present disclosure is applicable to various products. For example, an apparatus 200 may be realized as any type of server such as a tower server, a rack server, and a blade server. The apparatus 200 may be a control module (such as an integrated circuit module including a single die, and a card or a blade that is inserted into a slot of a blade server) mounted on a server.

For example, the apparatus 200 may be realized as any type of evolved Node B (eNB) such as a macro eNB and a small eNB. The small eNB may be an eNB such as a pico eNB, a micro eNB, and a home (femto) eNB that covers a cell smaller than a macro cell. Instead, the apparatus 200 may be realized as any other types of base stations such as a NodeB and a base transceiver station (BTS). The apparatus 200 may include a main body (that is also referred to as a base station apparatus) configured to control radio communication, and one or more remote radio heads (RRH) disposed in a different place from the main body. In addition, various types of terminals, which will be described below, may each operate as the apparatus 200 by temporarily or semi-persistently executing a function of the apparatus 200, for example, the terminal cannot obtain a network planning instruction from the base station when it is located out of coverage of the base station.

For example, a user equipment (for example, a master user equipment and a slave user equipment) may be realized as a mobile terminal such as a smartphone, a tablet personal computer (PC), a notebook PC, a portable game terminal, a portable/dongle type mobile router, and a digital camera, or an vehicle-mounted terminal such as a car navigation apparatus. The user equipment may be specifically realized as a terminal that performs device to device (D2D) communication or a terminal (that is also referred to as a machine type communication (MTC) terminal) that performs machine-to-machine (M2M) communication. Furthermore, the user equipment may be a radio communication module (such as an integrated circuit module including a single die) mounted on each of the terminals.

As shown in FIG. 2, the apparatus 200 in the wireless communication system according to the embodiment of the present disclosure may include a dynamic network planning triggering unit 202 and a master user equipment selecting unit 204. In the following, function configuration examples of the respective units are described in detail.

Herein, it should be noted that, in the specification, the term "be configured to" indicates that it can be implemented by programming, combination of hardware, combination of software and hardware and the like.

The dynamic network planning triggering unit 202 may be configured to trigger a dynamic network planning in a region managed by the apparatus based on a predetermined trigger event. The dynamic network planning includes selecting a master user equipment for a device to device communication. The master user equipment receives a signal from a base station and relays a signal between the base station and a slave user equipment during the device to device communication.

Preferably, the predetermined trigger event may include at least one of: a predetermined timer for triggering the dynamic network planning having expired, and hence the dynamic network planning is activated periodically by the dynamic network planning triggering unit 202 of the apparatus 200; a network performance degrading and thus failing to meet a requirement of a user equipment, for example, an outage rate being higher than a predetermined threshold; network performance parameters (such as a channel quality indicator (CQI) or the like) reported by the user equipment indicating a poor channel quality; and a change of a network structure. For example, if one or more small cells are turned off or coverage of a small cell is reduced, an effected user equipment or the small cell itself may request re-adjusting the network structure. Alternatively, for example, a macro cell sharing a baseband with the turned-off small cells re-adjusts the network structure actively. Alternatively, a new entrant user equipment may actively request re-adjusting the network structure or may cause the network structure to be re-adjusted. In a scenario example in which at least one master user equipment and associated slave user equipment thereof originally exist in a system, specifically, for example, when two master user equipment originally existing in the system move so that a distance therebetween is smaller than an interval distance, the dynamic network planning is triggered. As another example, in a case that a D2D communication requirement is generated between corresponding user equipment, if any one of the user equipment serves as the master user equipment and a distance between this master user equipment and the existing master user equipment is smaller than the interval distance, the dynamic network planning is triggered. In addition, for example, in a case that a requirement of performing D2D communication among user equipment in a first group and a requirement of performing D2D communication among user equipment in a second group are generated simultaneously, the dynamic network planning may be also triggered, and planning objects may be limited to the user equipment within the two groups. For example, based on the channel quality, a master user equipment A of the first group is selected from the user equipment in the first group and a master user equipment B of the second group is selected from the user equipment in the second group, while ensuring a distance between the user equipment A and B is larger than the interval distance. Specifically, upon occurrence of the above predetermined trigger event, the dynamic network planning triggering unit 202 may trigger the dynamic network planning in the region managed by the apparatus 200 so as to select the master user equipment in the region. Here, it should be noted that, the region managed by the apparatus 200 may be either an entire network region or any portion of the entire network region, such as regions originally served by the turned-off small cells.

The master user equipment selecting unit 204 may be configured to select one or more user equipment from the user equipment in the region managed by the apparatus 200 as master user equipment based on a channel quality between the base station and the user equipment. A distance between the master user equipment is larger than the interval distance.

It should be understood that, in a case of a D2D communication cluster, the master user equipment may be a cluster head of the D2D communication cluster in a cellular D2D communication, which forms the communication cluster with a slave user equipment and provides a control service to other user equipment to a certain extent.

In this case, as an example, the master user equipment may be selected based on a case in which all of the user equipment originally perform cellular communications normally, master user equipment and slave user equipment are selected to form D2D communications (clusters), or a case in which there have been already D2D communications (clusters) in the region, and the apparatus 200 detects that the cluster heads (i.e., the master user equipment) are too close to each other or resource utilization efficiency of the respective clusters are lower than a threshold or the like, and thus the cluster heads are re-selected. It should be noted that, the cluster heads may be re-selected from original remaining cluster members of the D2D communication clusters, or the D2D communication clusters may be re-planned.

It should be understood that, when selecting the master user equipment, it should ensure that the master user equipment can obtain a good signal from the base station and a certain distance exists between any two master user equipment, so that mutual interference on the receivers of links, which are using same spectrum and formed by master user equipment and slave user equipment served thereby, is in an allowed range while a high resource utilization efficiency is obtained, thereby ensuring normal operation of wireless transmission. In addition to data and signaling required for the master user equipment, a channel between the master user equipment and the base station also needs to transmit data and/or signaling required for a slave user equipment of which a signal is relayed by the master user equipment. Therefore, when selecting the master user equipment, the master user equipment selecting unit 204 may preferably select a user equipment, a channel between which and the base station has a good quality, as the master user equipment, to ensure the link with a high load to be stable and efficient. In addition, in order to obtain a high resource efficiency while reducing system interference, based on different system performance requirements (such as achieving a maximum network capacity, reducing interference or the like), a distance between the master user equipment using same spectrum should be larger than the interval distance determined based on the system performance requirements. Alternatively, the interval distance may be specified or pre-configured in advance, for example, may be determined based on a conventional system performance requirement.

Preferably, the master user equipment reuse communication resources to provide services to associated slave user equipment, and a service collectively provided by the base station and the one or more master user equipment distributed based on the determined interval distance can achieve an optimized network capacity.

In addition, preferably, the apparatus 200 may be further provided with a resource allocating unit configured to allocate to each of the master user equipment resources for communications with the slave user equipment, and the resources allocated to the user equipment may be the same.

Based on the above example of the D2D communication cluster, same resources may be reused by a D2D communication cluster 1 and a D2D communication cluster 2 according to the present disclosure. Specifically, for example, after the cluster heads (i.e., the master user equipment) are selected, an eNB dynamically allocates the same spectrum resources to the respective cluster heads, or the cluster heads autonomously select resources directly from a predetermined same D2D resource pool for an inner-cluster communication.

Figure 3:
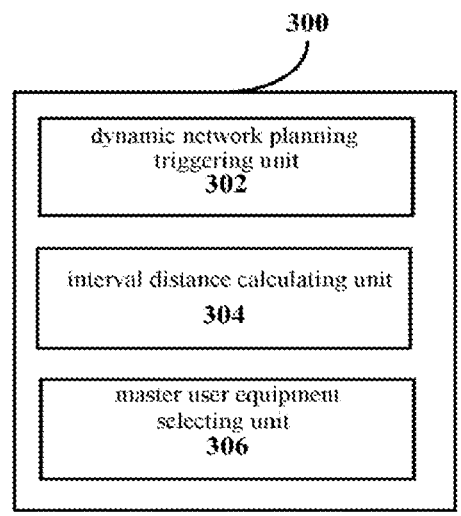
FIG. 3 is a block diagram showing a function configuration example of an apparatus in a wireless communication system according to another embodiment of the present disclosure.

In the following, the determination of the interval distance is described in detail with reference to FIG. 3. FIG. 3 is a block diagram showing a function configuration example of an apparatus in a wireless communication system according to another embodiment of the present disclosure.

As shown in FIG. 3, an apparatus 300 in the wireless communication system according to the embodiment may include a dynamic network planning triggering unit 302, an interval distance calculating unit 304 and a master user equipment selecting unit 306. Function configurations of the dynamic network planning triggering unit 302 and the master user equipment selecting unit 306 are respectively the same as those of the dynamic network planning triggering unit 202 and the master user equipment selecting unit 204 described with reference to FIG. 2 in the above, and details thereof are not described repeatedly herein. In the following, only a function configuration example of the interval distance calculating unit 304 is described in detail.

The interval distance calculating unit 304 may be configured to acquire performance parameter information, including a transmission power and a Signal to Interference plus Noise Ratio (SINR) requirement, of each of the user equipments in the region managed by the apparatus 300, and calculate the interval distance between the master user equipments based on the acquired information.

It should be understood that, the distance between the master user equipments may be determined based on at least the transmission power and the SINR requirement of the user equipments. Specifically, an effective transmission distance between user equipments may be determined based on the transmission power, and if the distance between the user equipments is larger than the effective transmission distance, communication cannot be performed between the user equipments. That is to say, distribution of the master user equipments should meet at least a condition that a slave user equipment served by a master user equipment can transmit a signal to and receive a signal from the master user equipment. Besides, based on the transmission power and the SINR requirement of the user equipment, the distribution of the master user equipments should also meet a condition that for a signal received via the links, which are using the same spectrum resources and formed by the master user equipments and the slave user equipment served thereby, mutual interference on the receivers of the links meet the SINR requirement.

Preferably, the slave user equipment associated with the one or more master user equipment distributed based on the determined interval distance may have a higher signal reception quality than a predetermined threshold for signals relayed by the associated master user equipment. It should be understood that, the signal reception quality of the slave user equipment for the signal relayed by its master user equipment should be at least higher than a signal reception quality of the slave user equipment for a signal sent directly from the base station.

Figure 4:
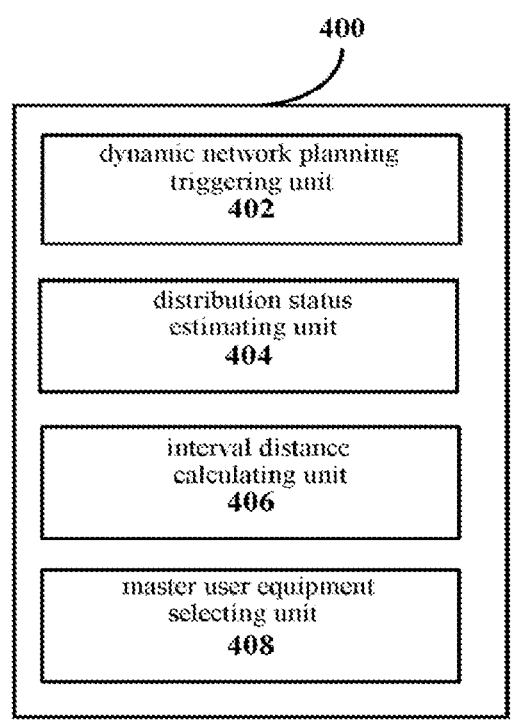
FIG. 4 is a block diagram showing a function configuration example of an apparatus in a wireless communication system according to another embodiment of the present disclosure.

It should be understood that, acquiring a distribution status of user equipment is advantageous to optimize the dynamic network planning. In the following, a function configuration example of an apparatus in a wireless communication system according to another embodiment of the present disclosure is described with reference to FIG. 4. FIG. 4 is a block diagram showing a function configuration example of an apparatus in a wireless communication system according to another embodiment of the present disclosure.

As shown in FIG. 4, an apparatus 400 in the wireless communication system according to the embodiment may include a dynamic network planning triggering unit 402, a distribution status estimating unit 404, an interval distance calculating unit 406 and a master user equipment selecting unit 408. Function configurations of the dynamic network planning triggering unit 402, the interval distance calculating unit 406 and the master user equipment selecting unit 408 are respectively the same as those of the dynamic network planning triggering unit 302, the interval distance calculating unit 304 and the master user equipment selecting unit 306 described with reference to FIG. 3 in the above, and details thereof are not described herein. In the following, only a function configuration example of the distribution status estimating unit 404 is described in detail.

The distribution status estimating unit 404 may be configured to estimate a distribution status of user equipments in a region managed by the apparatus 400 based on position information of the user equipments in the region.

Preferably, in the entire region managed by the apparatus 400, for a region with a predetermined size, for example, a circular region of a predetermined radius, if a node (e.g., user equipment) distribution density in the circular region is higher than a node distribution density in the entire region, the distribution status estimating unit 404 estimates that the distribution status of the user equipments is Cluster with respect to the predetermined radius, otherwise, the distribution status estimating unit 404 estimates that the distribution status of user equipments is Regular. Preferably, the predetermined radius is smaller than or equal to the effective transmission distance between the user equipments.

Specifically, position information of a user equipment may be represented as, for example, longitude and latitude of the user equipment. The distribution status estimating unit 404 may send a position information request to the user equipment, and the user equipment acquire, in response to the request, position information thereof by means of positioning modules carried by themselves, and report the acquired position information to the distribution status estimating unit 404. Alternatively, the distribution status estimating unit 404 may send the position information request to an access point, and the access point obtains position information of the user equipment through measurement and reports the position information to the distribution status estimating unit 404.

Next, the distribution status estimating unit 404 may calculate the characteristic parameters related to the distribution of the user equipment based on the acquired position information, to determine the distribution status of the user equipment. Possible characteristic parameters include a function K and a function L for representing correlation between node positions. The function K is defined as $K(r)=E[N(b(x,r))-1|x \in \Phi]/\lambda$, where $E[\cdot]$ is for calculating an expectation, $N(\cdot)$ is for calculating the number of nodes, $b(x,r)$ represents a set of nodes a distance from each of which to a node X does not exceed r, $\Phi$ represents a set of nodes in the investigated region A (i.e., the region managed by the apparatus 400), and $\lambda$ represents a node density in the region A. In addition, the function L is defined as $L(r)=\sqrt{K(r)/\pi}$. For the region A, if there are a large number of nodes in the region A, then computing amount of the function K and the function L is large. In this case, a sampling method may be adopted, that is, several partial regions are selected from the entire region A, and values of the two functions are calculated respectively for the partial regions, and then average values are calculated as approximations of function values of the entire region A.

It should be noted that, the node set $\Phi$ only includes nodes in the region A, and the distance r may be an upper boundary of an effective data transmission distance between nodes. Any portion in the network may be selected as the region A as needed. For example, if the node set $\Phi$ is firstly given and it needs to deduce a region covered by the node set $\Phi$ from the node set, the following method may be used. Firstly, closeness centrality of each node is calculated, which is defined as a reciprocals of an average value obtained by dividing a sum of distances between the node and all of other nodes by the number of the nodes. Then, a node having a smallest value of closeness centrality is selected as a central node. Finally, a maximal distance among the distances between the central node and other nodes is selected as a radius. Therefore, a method which is used for obtaining a circular region covering the node set $\Phi$ is realized. Similarly, methods which are used for obtaining regions of other shapes (such as a square region) covering the node set $\Phi$ can be realized.

Next, the distribution status of the user equipment is judged based on the calculated characteristic parameters. If $L(r)>r$, it indicates that the distribution of the user equipment is Cluster with respect to the distance r, i.e., an expectation of node number in unit area of $b(x,r)$ exceeds a node density in the entire region. If $L(r)<r$, it indicates that the distribution of the user equipment with respect to the distance r is Regular, i.e., the expectation of node number in unit area of $b(x,r)$ is lower than a node density in the entire region.

It should be understood that, the above method for determining the distribution status of the user equipment is for illustrative purposes only, and is not intended to be restrictive. Alternatively, for example, the distribution status of the user equipment may be estimated by simply calculating the number of user equipment per unit area of the region A. If the number of user equipment per unit area is greater than a predetermined threshold, it is determined that the distribution status is Cluster. Otherwise, it is determined that the distribution status is Regular.

Preferably, after the distribution status of the user equipment is determined, the interval distance calculating unit 406 may be further configured to calculate the interval distance based on the determined distribution status.

Specifically, the interval distance calculating unit 406 firstly selects a mathematical model suitable for describing the distribution status based on the determined distribution status. In an embodiment of the present disclosure, a Point Process is taken as a basic mathematical model, and the interval distance calculating unit 406 may further select a more accurate model to improve an accuracy of the description according to the distribution status. For example, if the distribution status of the user equipment is Cluster with respect to the distance r, a Point Process model suitable for Cluster type is selected, such as a Cluster Process (CP). Otherwise, if the distribution status of the user equipment with respect to the distance r is Regular, a Point Process model suitable for Regular type is selected, such as a Hard-Core Process (HCP) or a Strauss Process (SP). Since a more accurate model may generally increase complexity and computing time of performance estimation, in the embodiment, in order to make a tradeoff between the accuracy and the complexity, a more common Poisson Point Process (PPP) is taken as an example for illustration.

By fitting the PPP model in the network with a maximum likelihood method, a maximum likelihood estimation of a node density $\lambda$ of the model may be obtained as $\hat{\lambda}=N(A_i)/|A_i|$, where $A_i$ represents a sampled region and $|A_i|$ represents the area of the sampled region. The maximum likelihood estimation $\hat{\lambda}$ is used as the node density $\lambda$ in the region A.

Then, the interval distance calculating unit 406 may further calculate the interval distance between the user equipment based on a system performance requirement.

Specifically, in order to achieve an object of a maximum network capacity, the interval distance may be calculated in the following way. A square coverage region A is found for investigate nodes, with the method for obtaining the region covering the investigated node set as mentioned above when calculating the function K and function L, and it is assumed that a side length of the region A is D. Base stations BSs in the region A are modeled as a PPP model $\Phi_{BS}$ with a density of $\lambda_{BS}$. Direct user equipment dUEs are modeled as a PPP model $\Phi_d$ with a density of $\lambda_d$, where $U_d$ represents the number of direct user equipment. Master user equipment mUEs are modeled as a PPP model $\Phi_m$ with a density of $\lambda_m$, where $U_m$ represents the number of master user equipment. Slave user equipment sUEs are modeled as a PPP model $\Phi_s$ with a density of $\lambda_s$ and are distributed in a circle with mUE as a center and $R_m$ as a radius, where $U_s$ represents the number of slave user equipment distributed in the circle, hence a density of the slave user equipment in the entire region is $\lambda_m \lambda_s \pi R_m^2$. Hence the following equation is obtained as:

$$\lambda_d + \lambda_m + \lambda_m \lambda_s \pi R_m^2 = \lambda_{UE} \quad (1)$$

Particularly, $\lambda_s$ may be approximated as $\lambda_{UE}$, then, the following equation is obtained:

$$\lambda_d + \lambda_m + \lambda_m \lambda_{UE} \pi R_m^2 = \lambda_{UE} \quad (2)$$

In addition, assuming that $U_d \sim Po(\lambda_d|A|)$, it represents that $U_d$ conforms to a Poisson Point distribution with a density of $\lambda_d$ in the region A, or $$P\{U_d = i\} = \frac{1}{i!}\exp(-\lambda|A|)(-\lambda|A|)^i$$

is equivalently obtained, which is a standard formula of Poisson distribution, where the denominator i! represents a factorials of i, a first item of the numerator, exp(.), represents an exponential function taking e as a base, and the exponential is $-\lambda|A|$ in the brackets, and a second item of the numerator is $-\lambda|A|$ to a power of i. Similarly, it is obtained $U_m \sim Po(\lambda_m|A|)$ and $U_s \sim Po(\lambda_s \pi R_m^2)$. Due to properties of Poisson distribution, if $U_{d+m}$ represents a sum of the number of direct user equipment and the number of master user equipment, then it is obtained $U_{d+m} \sim Po((\lambda_d + \lambda_m)|A|)$, where $\lambda_{BS}$ and $\lambda_{UE}$ can be obtained with, for example, the maximum likelihood estimation method.

It is assumed that a total number of sub-channels in the system is M, and the sub-channels are divided into two portions, where $M_B$ sub-channels are used for transmission in connection with the base station BS and $M_m$ sub-channels are used for transmission between the master user equipment and the slave user equipment, then it is obtained $$M = M_B + M_m \quad (3).$$

In this case, a probability that the base station BS occupies one sub-channel and a probability that the master user equipment mUE occupies one sub-channel are respectively as follows:

$$P_{busy,B} = \frac{1}{M_B}\sum_{i=0}^{\infty}\min(i, M_B)P\{U_{d+m} = i\} \quad (4)$$

$$P_{busy,m} = \frac{1}{M_m}\sum_{i=0}^{\infty}\min(i, M_m)P(U_s = i) \quad (5)$$

In addition, it is assumed that a coverage density is defined as $P_C(T,\lambda,\alpha) = P[SINR>T]$, which represents a probability that any user equipment can obtain a target Signal to Interference plus Noise Ratio higher than a threshold T. It is assumed that $SINR = Phr^{-\alpha}/(\sigma^2 + I_r)$, where P represents a transmission power, a random variable h describes fading which conforms to an exponential distribution with an average value of $1/\mu$, r represents a distance between a transmitter and a receiver, and $\alpha$ is a path-loss factor. Further, $I_r = \sum_{j\in\Phi\backslash\{BS_0\}} Pg_i R_i^{-\alpha}$ represents suffered interference, where a random variable $g_i$ describes fading of an interference path, $R_i$ represents a path length from an interfering source to a target node, $\Phi$ represents a set of all base stations, $\{BS_0\}$ represents a set constituted by the base station $BS_0$ serving the target user, a symbol '\' represents a difference operation between the sets, and $\Phi\backslash\{BS_0\}$ represents the set of all members of $\Phi$ but not members of $\{BS_0\}$. It is assumed that a distance between the direct user equipment and its serving a base station and a distance between a master user equipment and its serving base station are r, then a probability distribution function (pdf) is $f(r) = \exp(-\lambda_{d+m}\pi r^2)2\pi\lambda_{d+m}r$, hence the following equation is obtained:

$$P_C(T_{d+m}, \lambda_{d+m}, \alpha_{d+m}) = P[SINR > T] \quad (6)$$

$$= \int_0^{\infty} f(r)P\left[h > \frac{T_{d+m}r^{\alpha_{d+m}}}{P}(\sigma^2 + I_r)\right]dr$$

$$= \int_0^{\infty} f(r)\exp\left(-\frac{\mu T_{d+m}r^{\alpha_{d+m}}\sigma^2}{p}\right)$$

$$L_{I_r}\left(\frac{\mu T_{d+m}r^{\alpha_{d+m}}}{p}\right)dr$$

where $L_{I_r}(\cdot)$ is a Laplace transform, and the equation (5) may be solved with reference to Stoyan D, Kendall W S, Mecke J. Stochastic geometry and its applications, 1995[J].

Akademie-verlag, Berlin (referred to as reference document 1 hereinafter). Similarly, a coverage density of slave user equipment $P_C(T_s, \lambda_s, \alpha_s)$ may be calculated.

An average rate (or Shannon capacity) of the direct user equipment and the master user equipment in a signal range of a network access point is:

$$\tau(\lambda_{d+m}, \alpha_{d+m}) = E[\ln(1 + SINR)] \quad (7)$$

$$= \int_0^\infty f(r) \int_0^\infty P\left\{\ln\left(1 + \frac{Phr^{-\alpha_{d+m}}}{\sigma^2 + I_r}\right) > t\right\} dt dr$$

$$= \int_0^\infty f(r) \int_0^\infty P\left\{h > \frac{I_r(\exp(t) - 1)}{Pr^{-\alpha_{d+m}}}\right\} dt dr$$

$$= \int_0^\infty f(r) \int_0^\infty \exp\left(-\frac{\mu r^{\alpha_{d+m}} \sigma^2 (\exp(t) - 1)}{p}\right)$$

$$L_{I_r}\left(\frac{\mu r^{\alpha_{d+m}}(\exp(t) - 1)}{p}\right) dt dr$$

Similarly, the equation (6) may be solved with reference to the reference document 1. Similarly, an average rate $\tau(\lambda_s, \alpha_s)$ of slave user equipment may be calculated.

A system capacity is a sum of average rates of various types of user equipment $\Phi_j$. An average rate for each type of user equipment $\Phi_j$ is a sum of products of a weight factor of the average rate to the total capacity, $\theta$, and an average rate $\tau(\lambda, \alpha)$ obtained by active nodes of this type of user equipment. Further, the average rate obtained by the active nodes of this type of user equipment is represented as a product of a bandwidth $\min(i, M_j)$ available for user equipment in $\Phi_j$, a coverage density $P_C(T_j, \lambda_j, \alpha_j)$, the number of active user equipment $P(U_j=i)$ and an average rate $\tau(\lambda_j, \alpha_j)$ of each user, which is represented as follows:

$$C = \sum \theta \tau(\lambda, \alpha) \quad (8)$$

$$= \sum_{j \theta(d+m,s)} \theta_j \sum_{\Phi_j} \tau(\lambda_j, \alpha_j)$$

$$= \sum_{j \theta(d+m,s)} \theta_j \sum_{i=1}^\infty \min(i, M_j) P_C(T_j, \lambda_i, \alpha_j) P(U_j = i) \tau(\lambda_j, \alpha_j)$$

Specifically, $\theta_j$ represents a weight factor of an average rate of user equipment to a total capacity, which represents a proportion of the average rate of this type of user equipment to a system total capacity, and can be adjusted as needed. For example, in the embodiment of the present disclosure, the master user equipment relays signals for the slave user equipment, that is, there is a redundant transmission. If the system capacity contains redundancy, $\theta_j$ can be set as 1. If only an effective signal is considered, the redundant signal transmission should be removed, and $\theta_{d+m}$ may be set as 1 and $\theta_s$ may be set as 0. Alternatively, a normalized proportion value may be set based on actual traffics of two links.

Taking the equation (2) as a condition, in a case that a maximum value $C^{max}$ is obtained by solving the equation (8), $\lambda_m$ is a required maximum density $\lambda_m^{max}$ of a distribution of master user equipment in the region A. In this case, it can be obtained a current interval distance between master user equipment is $$d_{min} = 2\sqrt{|A|/(\pi) \lambda_m^{max}} \quad (9).$$

Figure 5:
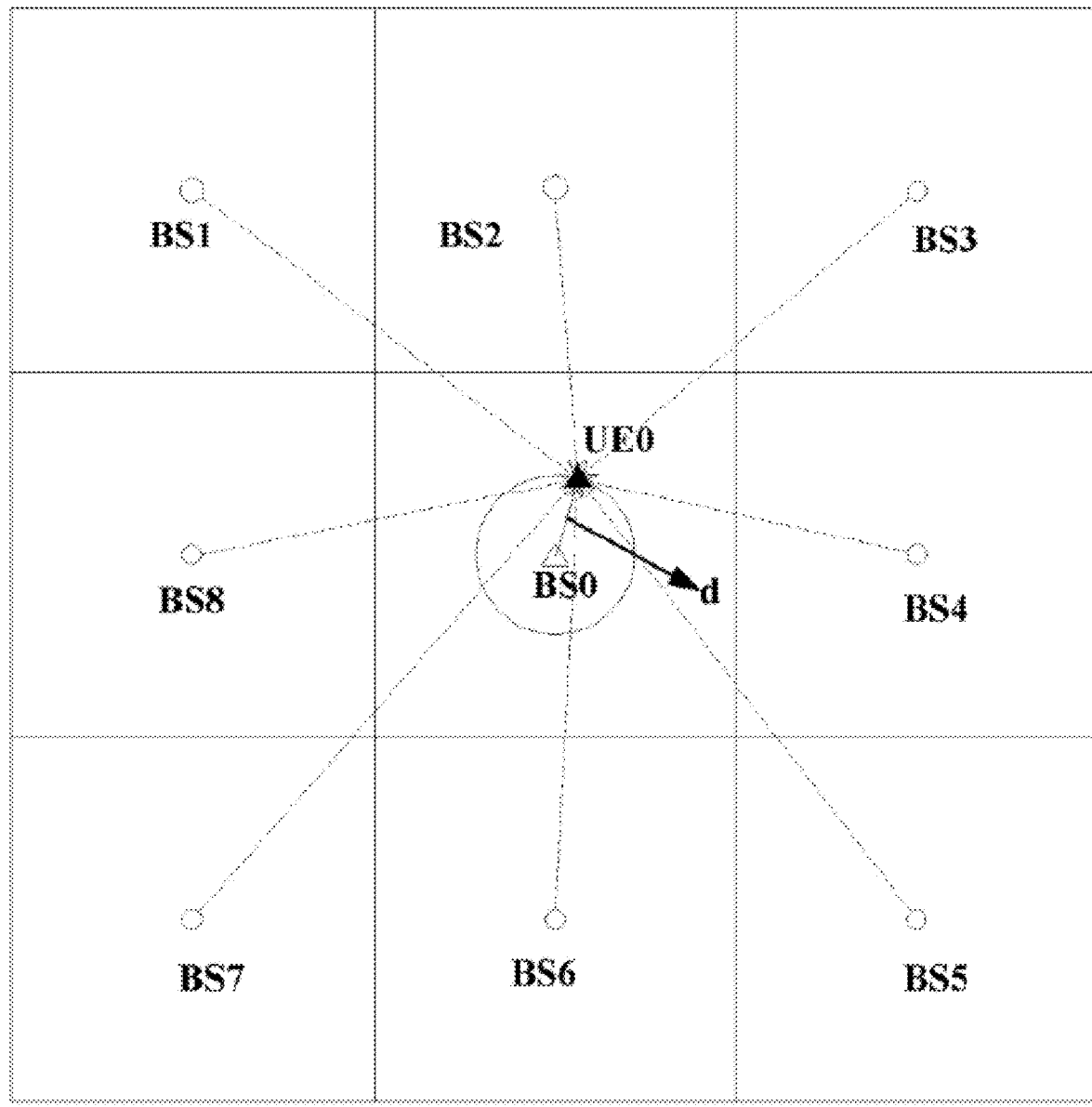
FIG. 5 is a schematic diagram showing a calculation of an interval distance in a case that master user equipment are distributed uniformly.

It should be understood that the method for calculating the interval distance between master user equipment given in the above is for illustrative purposes only, and is not intended to be restrictive. In the following, calculation of interval distance in a case of uniformly distributed master user equipment is described in detail with reference to FIG. 5. In FIG. 5, BS represents a master user equipment. For example, in order to reduce interference other than considering the network capacity, the region A may be equally divided into several small grids (for example N=9 shown in the figure). It is assumed that a master user equipment is placed at a central position of each grid, a maximum distance between the master user equipment to its associated slave user equipment is d and the master user equipment adopts same transmission power P, Taking any one of the master user equipment as a reference (without of generality, a master user equipment within a grid close to a central position of a group of grids may be chosen, for example BS0 in FIG. 5), and a Signal to Interference plus Noise Ratio (SINR) of any point (for example UE0 as shown in the figure) on the coverage edge of BS0 is calculated with a method of SINR=Phd$^{-\alpha}/(\sigma^2+I_r)$, where $I_r = \Sigma_{i \in [1, N-1]} Pg_i R_i^{-\alpha}$, and $R_i$ is a distance from BSi to UE0. It is ensured that the value of N reaches a maximum value in a case that the SINR is higher than a certain predetermined threshold, and thus the interval distance between the master user equipment can be obtained.

In this case, the master user equipment selecting unit 408 may be configured to select the master user equipment according to the distribution status of the user equipment in the region managed by the apparatus 400.

It should be noted that, for selection of the master user equipment, in addition to providing a good signal coverage for slave user equipment and maintaining a certain distance between the master user equipment to improve a resource utilization efficiency while meeting an interference requirement as described in the above, the distribution status of the user equipment should be also considered. The good signal coverage may be provided for the slave user equipment by selecting a user equipment a link between which and an infrastructure has a good quality. Regarding an interval distance which should be maintained between the master user equipment, it may be realized by making a distance between the master user equipment be larger than the determined interval distance. Further, the distribution status of the user equipment may be achieved by selecting an appropriate method based on whether the distribution status is Cluster or Regular. In the following, as an example, a process in which the master user equipment selecting unit 408 selects a master user equipment based on the above three factors is given.

Specifically, the master user equipment selecting unit 408 firstly calculates a Signal-to-Noise Ratio (SNR), a Signal to Interference plus Noise Ratio (SINR) and a Signal to Noise and Distortion Ratio (SNDR) of each of all the user equipment in the region A with respect to the infrastructure such as a base station, or calculates for example a CQI which is further processed and reflects a channel quality between the user equipment and the infrastructure, and obtains a node list S of user equipment in a descending order of channel quality values.

In a case that the distribution status is Cluster, the user equipment in the list S may be sequentially checked in order. Firstly, a first non-null node $n_1$ is selected. A circle is drawn by taking the node $n_1$ as a center and a half of the interval distance as a radius. Nodes falling within the circle and belonging to the list S may form a new node set $S_{n1}$ as a set of candidate slave user equipment of the node $n_1$. The node $n_1$ and the nodes in the set $S_{n1}$ are removed from the list S to obtain a new list $S_1$. Next, the nodes in the list $S_1$ are sequentially checked in order. A first node with a distance between which and the selected node $n_1$ is not smaller than the interval distance is selected as $n_2$. A circle is drawn by taking the node $n_2$ as a center and a half of the interval distance as a radius. Nodes falling within the circle and belonging to the list $S_1$ may form a new node set $S_{n2}$ as a set of candidate slave user equipment of the node $n_2$. The node $n_2$ and the nodes in the set $S_{n2}$ are removed from the list $S_1$ to obtain a new list $S_2$. Similarly, nodes in a list $S_{i-1}$ are sequentially checked in order. A first node with a distance between which and all of the selected nodes $n_j$ is not smaller than the interval distance is selected as $n_i$, where j<i. A circle is drawn by taking the node $n_i$ as a center and a half of the interval distance as a radius. Nodes falling within the circle and belonging to the list $S_{i-1}$ may form a new node set $S_{ni}$ as a set of candidate slave user equipment of the node $n_i$. The node $n_i$ and the nodes in the set $S_{ni}$ are removed from the list $S_{i-1}$ to obtain a new list $S_i$, and so on, until no node can be selected as the master user equipment or the node list is null.

In another aspect, if the distribution status is Regular, a target region is divided with square regions having a side length of the interval distance. In each sub-region, only one node is selected as the master user equipment and other nodes form a set of candidate slave user equipment of the master user equipment. The master user equipment may be selected according to a parameter of closeness centrality. A node with a minimum closeness centrality value, i.e., a node closest to the center of the square is selected as the master user equipment $n_i$, and other nodes may form a corresponding set $S_{ni}$ of candidate slave user equipment.

It should be noted that, the manners for selecting the master user equipment given in the above are for illustrative purposes only, and are not intended to be restrictive, and those skilled in the art may conceive of other manners to select the master user equipment, based on the above factors that should be considered when selecting the master user equipment, and these manners should be also considered to fall within the scope of the present disclosure. For example, when ranking user equipment the node distribution status of which is Cluster, the user equipment may be ranked based on closeness centralities thereof, instead of the channel qualities between the user equipment and the infrastructure.

After selecting the master user equipment as described above, preferably, in order to further determine the network structure, slave user equipment served by each of the master user equipment and direct user equipment other than the slave user equipment should be also determined. In the following, determinations of slave user equipment and direct user equipment are described in detail with reference to FIG. 6.

Figure 6:
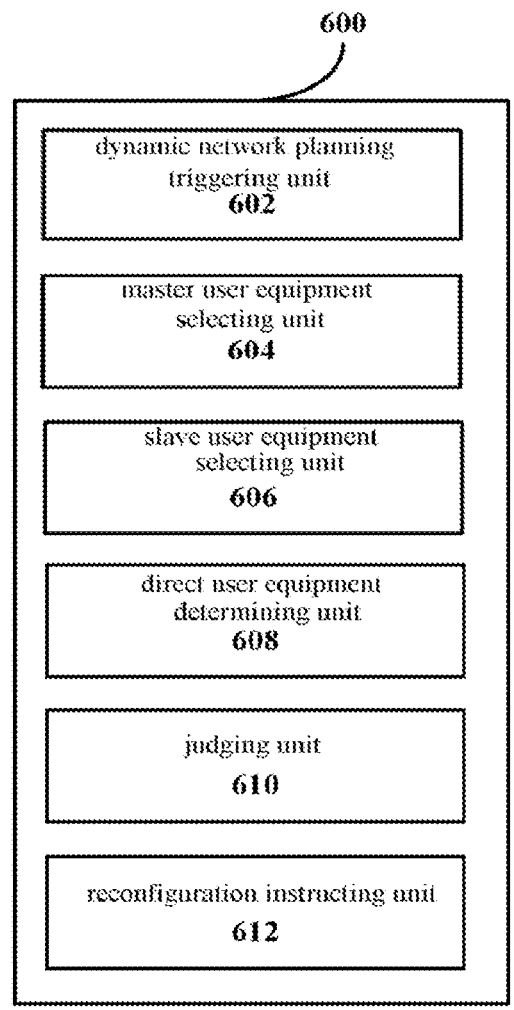
FIG. 6 is a block diagram showing a function configuration example of an apparatus in a wireless communication system according to another embodiment of the present disclosure.

FIG. 6 is a block diagram showing a function configuration example of an apparatus in a wireless communication system according to an embodiment of the present disclosure.

As shown in FIG. 6, an apparatus 600 in the wireless communication system according to the embodiment may include a dynamic network planning triggering unit 602, a master user equipment selecting unit 604, a slave user equipment selecting unit 606, a direct use equipment determining unit 608, a judging unit 610 and a reconfiguration instructing unit 612. Function configurations of the dynamic network planning triggering unit 602 and the master user equipment selecting unit 604 are respectively the same as the function configurations of the dynamic network planning triggering unit and the master user equipment selecting unit described above with reference to FIGS. 2 to 5, and thus details thereof are not described repeatedly herein. In the following, only function configuration examples of the slave user equipment selecting unit 606, the direct user equipment determining unit 608, the judging unit 610 and the reconfiguration instructing unit 612 are described in detail.

The slave user equipment selecting unit 606 may be configured to determine, for each of the master user equipment, a slave user equipment to be served by the master user equipment, based on positions of user equipment other than the master user equipment in the region managed by the apparatus 600 and a data relaying capability of the master user equipment.

Specifically, the slave user equipment is selected based on factors such as a selection priority of the slave user equipment, a service requirement of the slave user equipment, a relaying capability of the master user equipment, position relationship between the slave user equipment and the master user equipment and the like.

The selection priority of the slave user equipment refers to that, for example, if some selected master user equipment dedicatedly serve a certain or a certain group of slave user equipment, then this or these slave user equipment may be preferably served by the master user equipment.

The relaying capability of the master user equipment is affected by performance of the master user equipment, for example, a data transmission and processing capability and a power-supply endurance and the like. Moreover, the service requirement and geographical distribution of the slave user equipment should also be considered, and all of these factors determine an upper boundary of the number of slave user equipment that the master user equipment can serve. For example, a method for estimating the relaying capability of the master user equipment includes: firstly determining a data relaying rate v in a unit time, and multiplying the rate v by an available time duration of the master user equipment to obtain the relaying capability of the master user equipment, i.e., a total capacity of data relaying. The available time duration depends on for example a minimum value of a power-supply endurance time of the master user equipment, a residence time duration during which the master user equipment stays at a place, a serving time during which it is predicted that a user equipment serves as the master user equipment and the like.

Based on the above factors, a possible example method for selecting the slave user equipment is provided. In the method, for the master user equipment $n_i$ determined by the master user equipment selecting unit 604 and the set $S_{ni}$ of candidate slave user equipment thereof, the slave user equipment selecting unit 606 may rank the user equipment in the set $S_{ni}$ based on selection priorities of the user equipment in the set $S_{ni}$ of slave user equipment and a difference between qualities of services that the user equipment obtain from the master user equipment and from the infrastructure (such as a difference between SNRs), then select sequentially the user equipment in the set $S_{ni}$ as the slave user equipment, and end the selection until a service requirement of the selected slave user equipment achieve the relaying capability of the master user equipment $n_i$ or all of the user equipment in the set $S_{ni}$ are selected. In addition, it should be noted that when selecting the slave user equipment, a capability of the user equipment should be also considered, for example, a slave user equipment is selected from user equipment supporting D2D communication. Besides, in a case that a requirement for explicit communication object between user equipment exists, the selection of the slave user equipment should consider the requirement of the user equipment.

The direct user equipment determining unit 608 may be configured to determine a user equipment other than the selected master user equipment and the selected slave user equipment in the region managed by the apparatus 600 as a direct user equipment obtaining service directly from the base station.

After the master user equipment, the slave user equipment served by the master user equipment and the remaining direct user equipment are determined, a network planning of the target region is determined accordingly.

The judging unit 610 may be configured to judge, in response to an occurrence of the predetermined trigger event in the region managed by the apparatus 600, whether to activate a dynamic network planning by comparing an expected maximum network capacity achieved by the dynamic network planning based on the interval distance with a current network capacity.

Specifically, the judging unit 610 compares the expected maximum network capacity that the above determined network planning can achieve with the current network capacity. If a difference between the above two network capacities is greater than a predetermined threshold, it indicates that the network planning can improve a network performance greatly. On the other hand, if variation in network capacity is not significant before and after the network planning is performed, it indicates that it may be unnecessary to perform the network planning.

The reconfiguration instructing unit 612 may send a reconfiguration instruction to network nodes, including the master user equipment and the base station, involved in the dynamic network planning, to instruct the network nodes to change current network connections.

Preferably, in a case that it is judged by the judging unit 610 to activate the dynamic network planning, the reconfiguration instructing unit 612 may send an instruction to network nodes, including the master user equipment, the slave user equipment served by the master user equipment and the direct user equipment, involved in the dynamic network planning, to instruct these network nodes to change their current network connections based on the determined network planning.

It should be understood that, although the function configuration examples of the apparatuses in the wireless communication system according to the embodiments of the present disclosure have been described above with reference to FIGS. 2 to 6, these examples are for illustrative purposes only and are not intended to be restrictive. those skilled in the art may modify the above embodiments based on the principle of the present disclosure, for example, add, delete or combine the function modules in each of the embodiments, and all of these modifications fall within the scope of the present disclosure. For example, in the above embodiment described with reference to FIG. 6, if cost such as resources necessary for changing the current network structure is not considered, the judging unit may not be included. Thus, once a network planning is determined, the reconfiguration instructing unit may instruct the network nodes to perform the network planning.

Figure 7:
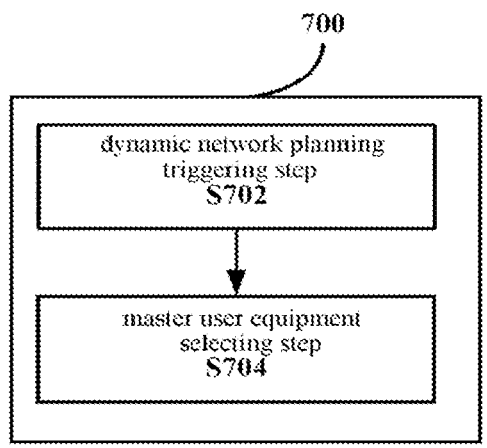
FIG. 7 is a flowchart showing a process example of a method in a wireless communication system according to an embodiment of the present disclosure.

Next, a process example of a method in a wireless communication system according to an embodiment of the present disclosure is described with reference to FIG. 7. FIG. 7 is a flowchart showing a process example of a method in a wireless communication system according to an embodiment of the present disclosure.

As shown in FIG. 7, a method 700 in the wireless communication system according to the embodiment may include a dynamic network planning triggering step S702 and a master user equipment selecting step S704.

In the dynamic network planning triggering step S702, a dynamic network planning in a region in which the method 700 is performed is triggered based on a predetermined trigger event. The dynamic network planning includes selecting a master user equipment for device to device communication, and the master user equipment receives a signal from a base station and relays a signal between the base station and a slave user equipment during the device to device communication. Preferably, the predetermined trigger event may include at least one of: a predetermined timer for triggering the dynamic network planning having expired, network performance degrading and thus failing to meet requirements of the user equipment, network performance parameters reported by the user equipment indicating a poor channel quality, and a change of a network structure.

Then, in the master user equipment selecting step S704, one or more user equipment are selected from user equipment in a target region as master user equipment based on channel qualities between the base station and the user equipment, and a distance between the master user equipment is larger than an interval distance. The interval distance may be determined based on a specific system performance requirement (such as achieving a maximum system capacity, reducing interference or the like) or may be pre-determined.

Preferably, the master user equipment may reuse communication resources to provide service to associated slave user equipment, and a service collectively provided by the base station and the one or more master user equipment distributed based on the determined interval distance is able to realize an optimized network capacity.

In addition, preferably, the method 700 may further include a resource allocating step of allocating resources to the master user equipment for communication with slave user equipment, and the resources allocated to the respective master user equipment may be the same.

Figure 8:
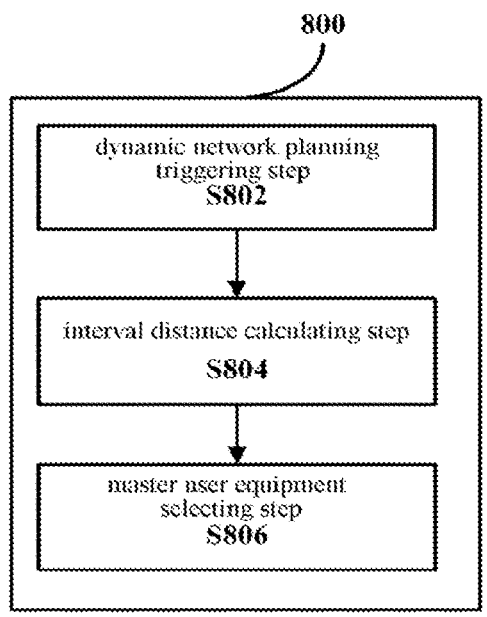
FIG. 8 is a flowchart showing a process example of a method in a wireless communication system according to another embodiment of the present disclosure.

In the following, determination of the interval distance is described with reference to FIG. 8. FIG. 8 is a flowchart showing a process example of a method in a wireless communication system according to another embodiment of the present disclosure.

As shown in FIG. 8, a method 800 in the wireless communication system according to the embodiment may include a dynamic network planning triggering step S802, an interval distance calculating step S804 and a master user equipment selecting step S806. Processes in the dynamic network planning triggering step S802 and the master user equipment selecting step S806 are respectively the same as the processes in the dynamic network planning triggering step S702 and the master user equipment selecting step S704, and thus details thereof are not described repeatedly herein. In the following, only processing in the interval distance calculating step S804 is described in detail.

In the interval distance calculating step S804, performance parameter information, including a transmission power and a Signal to Interference plus Noise Ratio (SINR) requirement, of each of the user equipment in the target region may be acquired, and the interval distance between the master user equipment may be calculated based on the acquired information.

Preferably, slave user equipment associated with the one or more master user equipment which are distributed based on the determined interval distance have a higher signal reception quality than a predetermined threshold for signals relayed by the respective master user equipment. It should be understood that the signal reception quality of the slave user equipment for a signal relayed by its master user equipment should be at least higher than a signal reception quality for a signal transmitted directly from a base station.

Figure 9:
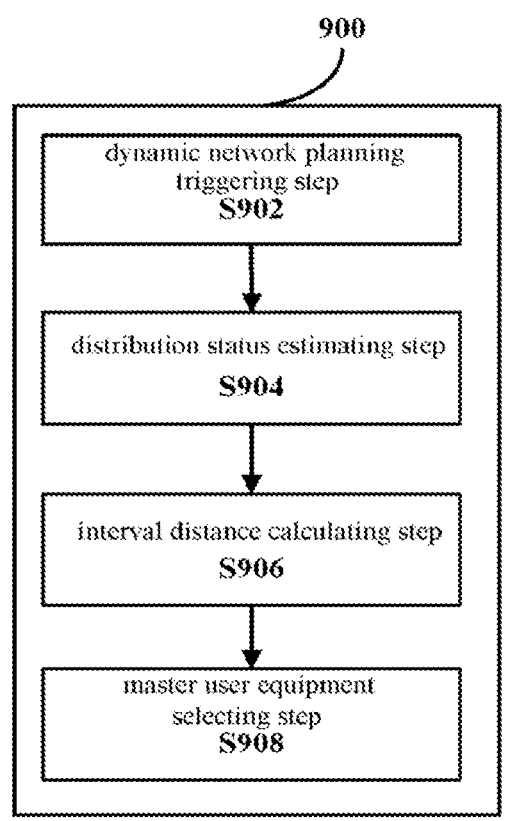
FIG. 9 is a flowchart showing a process example of a method in a wireless communication system according to another embodiment of the present disclosure.

FIG. 9 is a flowchart showing a process example of a method in a wireless communication system according to another embodiment of the present disclosure.

As shown in FIG. 9, a method 900 in the wireless communication system according to the embodiment may include a dynamic network planning triggering step S902, a distribution status estimating step S904, an interval distance calculating step S906 and a master user equipment selecting step S908. Processes in the dynamic network planning triggering step S902, the interval distance calculating step S906 and the master user equipment selecting step S908 are respectively the same as the processes in the dynamic network planning triggering step S802, the interval distance calculating step S804 and the master user equipment selecting step S806, and thus details thereof are not described herein. In the following, only processing in the distribution status estimating step S904 is described in detail.

In the distribution status estimating step S904, a distribution status of the user equipment in the target region may be estimated based on position information of the user equipment in the region. Preferably, for a circular region having a predetermined radius within an entirety of the target region, if a node distribution density in the circular region is higher than a node distribution density in the entirety of the region, it is estimated that the distribution status of the user equipment is Cluster with respect to the predetermined radius. Otherwise, the distribution status of the user equipment is estimated as a Regular. Preferably, the predetermined radius is smaller than or equal to an effective transmission distance between user equipment.

Preferably, after the distribution status of the user equipment is determined, the interval distance may be further calculated based on the determined distribution status in the interval distance calculating step S906, and the master user equipment may be further selected based on the determined distribution status in the master user equipment selecting step S908.

Figure 10:
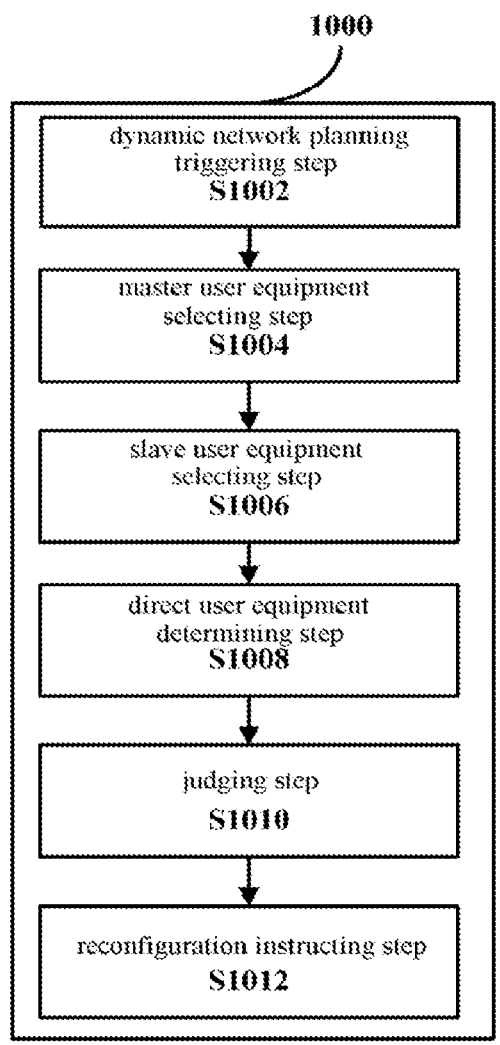
FIG. 10 is a flowchart showing a process example of a method in a wireless communication system according to another embodiment of the present disclosure.

FIG. 10 is a flowchart showing a process example of a method in a wireless communication system according to another embodiment of the present disclosure.

As shown in FIG. 10, a method 1000 in the wireless communication system according to the embodiment may include a dynamic network planning triggering step S1002, a master user equipment selecting step S1004, a slave user equipment selecting step S1006, a direct user equipment determining step S1008, a judging step S1010 and a reconfiguration instructing step S1012. Processes in the dynamic network planning triggering step S1002 and the master user equipment selecting step S1004 are respectively the same as the processes in the dynamic network planning triggering step and the master user equipment selecting step described above with reference to FIGS. 7 to 9, and thus details thereof are not described repeatedly herein. In the following, only processes in the slave user equipment selecting step S1006, the direct user equipment selecting step S1008, the judging step S1010 and the reconfiguration instructing step S1012 are described in detail.

After the master user equipment are selected, in the slave user equipment selecting step S1006, for each of the master user equipment, a slave user equipment to be served by the master user equipment is determined based on a data relaying capability of the master user equipment and positions of user equipment other than the master user equipment in the region in which the method 1000 is performed.

Then, in the direct user equipment determining step S1008, a user equipment other than the selected master user equipment and the selected slave user equipment in the target region may be determined as the direct user equipment which obtains service directly from the base station.

Once the master user equipment, the slave user equipment thereof and the direct user equipment are determined, a network planning in the target region is determined.

Then, in the judging step S1010, in response to an occurrence of the predetermined trigger event in the region, it is judged whether to activate the dynamic network planning by comparing an expected maximum network capacity that can be achieved by the dynamic network planning based on the determined interval distance with a current network capacity. Specifically, in the judging step S1010, an expected maximum network capacity that can be achieved with the above determined network planning (the master user equipment distributed based on the determined interval distance, the slave user equipment thereof and the direct user equipment) is compared with the current work capacity. If a difference between the expected maximum network capacity and the current network capacity is greater than a predetermined threshold, it indicates that the network performance can be significantly improved by the network planning. Otherwise, if variation in the network capacity is not large before and after the network planning, it indicates that it may be unnecessary to perform the network planning.

If it is judged to activate a dynamic network planning, then in the reconfiguration instructing step S1012, a reconfiguration instruction may be sent to network nodes involved in the dynamic network planning, including the master user equipment and the base station, to instruct the network nodes to change current network connections.

It should be understood that, the process examples of the methods in the wireless communication system according to the embodiments of the present disclosure described above with reference to FIGS. 7 to 10 are for illustrative purposes only and are not intended to be restrictive. Those skilled in the art may modify the above embodiments according to the principle of the present disclosure, for example, add, delete or combine the steps in each of the embodiments, and all of these modifications fall within the scope of the present disclosure.

In addition, it should be noted that, embodiments of methods described with reference to FIGS. 7 to 10 correspond to embodiments of apparatuses described with reference to FIGS. 2 to 6. Therefore, contents which are not described in detail in the embodiments of methods may be referred to descriptions at corresponding positions in the embodiments of apparatuses, and are not described repeatedly herein.

Besides, an electronic device is further provided according to an embodiment of the present disclosure. The electronic device is arranged in a wireless communication system and includes a circuit configured to perform a method including: a dynamic network planning triggering step of triggering a dynamic network planning in a region in which the method is performed, based on a predetermined trigger event, in which the dynamic network planning includes selecting a master user equipment for a device to device communication, and the master user equipment receives a signal from a base station and relays a signal between the base station and a slave user equipment during the device to device communication; and a master user equipment selecting step of selecting one or more user equipment from user equipment in the region as master user equipment based on a channel quality between the base station and the user equipment, in which a distance between the master user equipment is larger than an interval distance.

A memory medium is further provided according to an embodiment of the present disclosure. The memory medium includes machine-readable program codes which, when being executed on an information processing device, cause the information processing device to perform a method including: a dynamic network planning triggering step of triggering a dynamic network planning in a region in which the method is performed, based on a predetermined trigger event, in which the dynamic network planning includes selecting a master user equipment for a device to device communication, and the master user equipment receives a signal from a base station and relays a signal between the base station and a slave user equipment during the device to device communication; and a master user equipment selecting step of selecting one or more user equipment from user equipment in the region as master user equipment based on a channel quality between the base station and the user equipment, in which a distance between the master user equipment is larger than an interval distance.

A program product is further provided according to an embodiment of the present disclosure. The program product includes machine-executable instructions which, when being executed on an information processing device, cause the information processing device to perform a method including: a dynamic network planning triggering step of triggering a dynamic network planning in a region in which the method is performed, based on a predetermined trigger event, in which the dynamic network planning includes selecting a master user equipment for a device to device communication, and the master user equipment receives a signal from a base station and relays a signal between the base station and a slave user equipment during the device to device communication; and a master user equipment selecting step of selecting one or more user equipment from user equipment in the region as master user equipment based on a channel quality between the base station and the user equipment, in which a distance between the master user equipment is larger than an interval distance.

It should be understood that, the machine-executable instructions in the memory medium and the program product according to the embodiments of the present disclosure may be executed to achieve methods corresponding to the above embodiments of apparatuses. In this case, contents which are not described in detail here may be referred to foregoing descriptions at corresponding positions, and will not be described repeatedly herein.

Accordingly, a storage medium on which the above program product storing machine executable instructions is carried is also included in the disclosure of the invention. The storage medium includes but is not limited to a floppy disk, an optical disk, a magneto-optical disk, a storage card, a memory rod and the like.

Furthermore, it shall be noted that the foregoing series of processes and apparatuses can also be embodied in software and/or firmware. In the case of being embodied in software and/or firmware, a program constituting the software is installed from a storage medium or a network to a computer with a dedicated hardware structure, e.g., a general purpose personal computer 1100 illustrated in FIG. 11, which can perform various functions when various programs are installed thereon.

Figure 11:
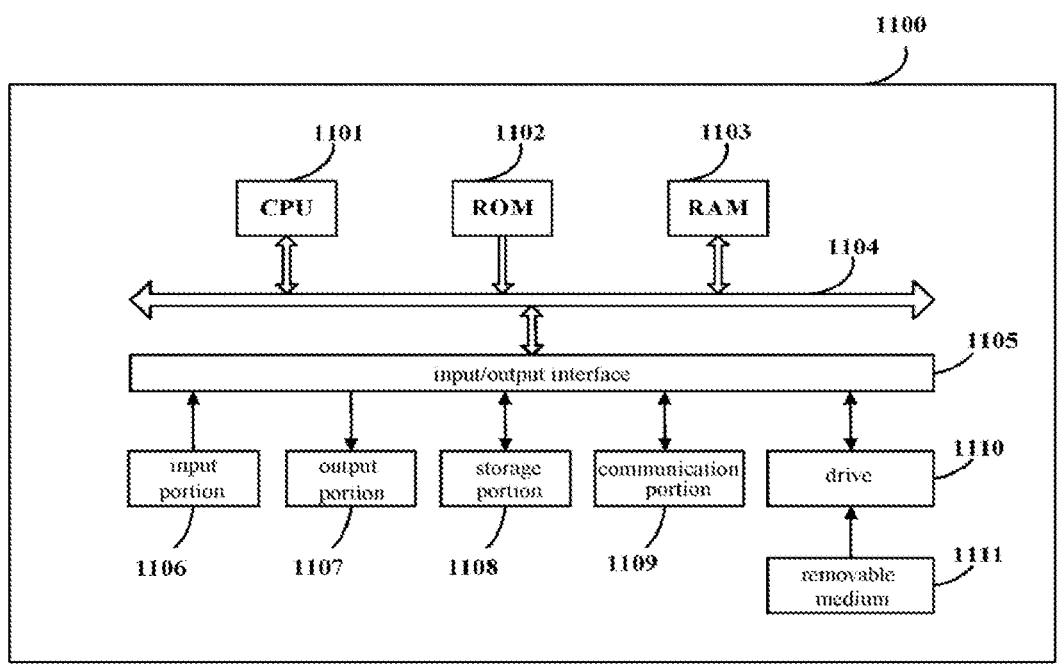
FIG. 11 is a block diagram of an exemplary structure of a personal computer serving as an information processing apparatus in an embodiment of the present disclosure.

In FIG. 11, a Central Processing Unit (CPU) 1101 performs various processes according to a program stored in a Read Only Memory (ROM) 1102 or loaded from a storage portion 1108 into a Random Access Memory (RAM) 1103 in which data required when the CPU 1101 performs the various processes is also stored as needed.

The CPU 1101, the ROM 1102 and the RAM 1103 are connected to each other via a bus 1104 to which an input/output interface 1105 is also connected.

The following components are connected to the input/output interface 1105: an input portion 1106 including a keyboard, a mouse, etc.; an output portion 1107 including a display, e.g., a Cathode Ray Tube (CRT), a Liquid Crystal Display (LCD), etc., a speaker, etc.; a storage portion 1108 including a hard disk, etc.; and a communication portion 1109 including a network interface card, e.g., an LAN card, a modem, etc. The communication portion 1109 performs a communication process over a network, e.g., the Internet.

A drive 1110 is also connected to the input/output interface 1105 as needed. A removable medium 1111, e.g., a magnetic disk, an optical disk, an magneto optical disk, a semiconductor memory, etc., can be installed on the drive 1110 as needed so that a computer program fetched therefrom can be installed into the storage portion 1108 as needed.

In the case that the foregoing series of processes are performed in software, a program constituting the software is installed from a network, e.g., the Internet, etc., or a storage medium, e.g., the removable medium 1111, etc.

Those skilled in the art shall appreciate that such a storage medium will not be limited to the removable medium 1111 illustrated in FIG. 11 in which the program is stored and which is distributed separately from the apparatus to provide a user with the program. Examples of the removable medium 1111 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1102, a hard disk included in the storage portion 1108, etc., in which the program is stored and which is distributed together with the apparatus including the same to the user.

Preferred embodiments of the disclosure have been described above with reference to the drawings, but the disclosure is not limited to the above examples of course. Those skilled in the art may devise various alternations and modifications within the scope of the appended claims, and it should be understood that these alternations and modifications would naturally fall within the technical scope of the disclosure.

For example, multiple functions included in one unit in the above embodiments may be implemented by separated apparatuses. Alternatively, multiple functions implemented by multiple units in the above embodiments may be implemented by separated apparatuses respectively. Furthermore, one of the above functions may be implemented by multiple units. Without saying, such configuration is included in the technical scope of the disclosure.

In this specification, the steps described in the flow charts include not only processes performed in the sequential order as described chronically, but also processes performed concurrently or separately but not necessarily chronically. Further, even in the steps processed chronically, without saying, the order can be appropriately changed.

The invention claimed is:

1. An apparatus in a wireless communication system, comprising:
circuitry, where the circuitry is configured to:
trigger a dynamic network planning for a plurality of user equipments in a region managed by the apparatus based on a predetermined trigger event;
estimate a distribution status of the plurality of user equipments in the region based on position information of the plurality of user equipments in the region;
calculate an interval distance at least in part based on the distribution status; and
in response to the predetermined trigger event, select a first master user equipment at least in part based on the distribution status and such that a distance between the first master user equipment and a second master user equipment is larger than the interval distance,
wherein the first master user equipment receives a signal from a base station and relays a signal between the base station and a slave user equipment during a device to device communication.

2. The apparatus according to claim 1, wherein the circuitry is further configured to:
acquire performance parameter information comprising a transmission power and a Signal to Interference plus Noise Ratio requirement of each of the plurality of user equipments in the region; and
calculate the interval distance at least in part based on the acquired performance parameter information.

3. The apparatus according to claim 1, wherein the slave user equipment associated with the first master user equipment has a higher signal reception quality than a predetermined threshold for signals relayed by the first master user equipment.

4. The apparatus according to claim 2, wherein the first and the second master user equipment reuse communication resources to provide services to an associated plurality of slave user equipments, and a service collectively provided by the apparatus and the first and the second master user equipment is able to realize an optimized network capacity.

5. The apparatus according to claim 1, wherein the circuitry is further configured to send a reconfiguration instruction to network nodes involved in the dynamic network planning, including the master user equipment and the base station, to instruct the network nodes to change current network connections.

6. The apparatus according to claim 1, wherein, for a circular region having a predetermined radius within an entirety of the region, if a node distribution density in the circular region is higher than a node distribution density in the entirety of the region, the distribution status estimating unit estimates that the distribution status of the plurality of user equipments is Cluster with respect to the predetermined radius, otherwise, the distribution status estimating unit estimates that the distribution status of the plurality of user equipments is Regular.

7. The apparatus according to claim 6, wherein the predetermined radius is smaller than or equal to an effective transmission distance between the first master user equipment and the slave user equipment.

8. The apparatus according to claim 1, wherein the circuitry is further configured to:
determine, for each of a plurality of master user equipments comprising the first and the second master user equipment, a slave user equipment to be served by each master user equipment, based on positions of the plurality of user equipments other than the plurality of master user equipments in the region and a data relaying capability of the plurality of master user equipments; and
determine a user equipment other than the plurality of master user equipments and the determined slave user equipment in the region as a direct user equipment, which directly obtains service from the base station.

9. The apparatus according to claim 1, wherein the circuitry is further configured to:
judge, in response to an occurrence of the predetermined trigger event in the region, whether to activate the dynamic network planning by comparing an expected maximum network capacity achieved by the dynamic network planning based on the interval distance with a current network capacity.

10. The apparatus according to claim 1, wherein the predetermined trigger event comprises at least one of: a predetermined timer for triggering the dynamic network planning having expired, network performance degrading and thus failing to meet requirements of the plurality of user equipments, network performance parameters reported by the plurality of user equipments indicating a poor channel quality, and a change of a network structure.

11. A method in a wireless communication system, comprising:
a dynamic network planning triggering step of triggering a dynamic network planning in a region comprising a plurality of user equipments, based on a predetermined trigger event;
estimating a distribution status of the plurality of user equipments in the region based on position information of the plurality of user equipments in the region;
calculating an interval distance at least in part based on the distribution status; and
in response to the predetermined trigger event, selecting a first master user equipment at least in part based on the distribution status and such that a distance between the first master user equipment and a second master user equipment is larger than the interval distance,
wherein the first master user equipment receives a signal from a base station and relays a signal between the base station and a slave user equipment during a device to device communication.

12. The method according to claim 11, further comprising:
acquiring performance parameter information, including a transmission power and a Signal to Interference plus Noise Ratio requirement, of each of the plurality of user equipments in the region;
calculating the interval distance at least in part based on the acquired information.

13. The method according to claim 11, wherein the slave user equipment associated with the first master user equipment has a higher signal reception quality than a predetermined threshold for signals relayed by the first master user equipment.

14. The method according to claim 12, wherein the master user equipment reuse communication resources to provide services to an associated plurality of slave user equipments, and a service collectively provided by the base station and the first and the second master user equipment is able to realize an optimized network capacity.

15. The method according to claim 11, wherein estimating the distribution status further comprises, for a circular region having a predetermined radius within an entirety of the region, if a node distribution density in the circular region is higher than a node distribution density in the entirety of the region, it is estimated that the distribution status of the plurality of user equipments is Cluster with respect to the predetermined radius, otherwise, it is estimated that the distribution status of the plurality of user equipments is Regular.

16. The method according to claim 11, further comprising:
   a slave user equipment selecting step of determining, for each of a plurality of master user equipments comprising the first and the second master user equipment, a slave user equipment to be served by each master user equipment, based on positions of the plurality of user equipments other than the plurality of master user equipments in the region and a data relaying capability of the plurality of master user equipments; and
   a direct user equipment determining step of determining a user equipment other than the plurality of master user equipments and the determined slave user equipment in the region as a direct user equipment, which directly obtains service from the base station.

17. The method according to claim 11, further comprising:
   a judging step of judging, in response to an occurrence of the predetermined trigger event in the region, whether to activate the dynamic network planning by comparing an expected maximum network capacity achieved by the dynamic network planning based on the interval distance with a current network capacity.

18. The method according to claim 11, wherein the predetermined trigger event comprises at least one of: a predetermined timer for triggering the dynamic network planning having expired, network performance degrading and thus failing to meet requirements of the plurality of user equipments, network performance parameters reported by the plurality of user equipments indicating a poor channel quality, and a change of a network structure.

19. The method according to claim 11, wherein the first master user equipment is selected at least in part based on a channel quality between the base station and the plurality of user equipments.

* * * * *